Dec. 4, 1962 M. D. McFARLANE 3,067,312
TEMPERATURE CONTROL DEVICE
Filed Oct. 14, 1957 3 Sheets-Sheet 1

INVENTOR.
Maynard D. McFarlane.
BY
ATTORNEY

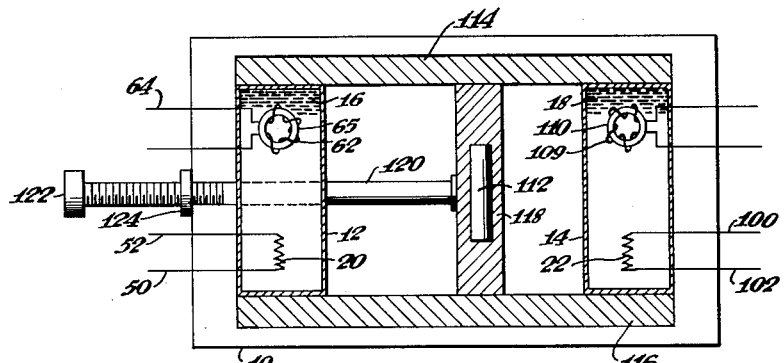

INVENTOR.
Maynard D. McFarlane.
BY
ATTORNEY.

United States Patent Office 3,067,312
Patented Dec. 4, 1962

3,067,312
TEMPERATURE CONTROL DEVICE
Maynard D. McFarlane, Corona Del Mar, Calif., assignor to Robertshaw-Fulton Controls Company, Richmond, Va., a corporation of Delaware
Filed Oct. 14, 1957, Ser. No. 689,910
9 Claims. (Cl. 219—20)

This invention relates to temperature control devices and more particularly to devices for maintaining accurate temperature control within a few hundredths of a degree.

An example of an application wherein extremely accurate temperature control is required is that of the crystal oscillator circuit. Since even a small change in temperature will seriously affect the frequency stability of such a circuit, it is necessary to subject the crystal of the oscillator circuit to a continuous constant temperature condition to prevent drifting from a desired set frequency.

One method of producing this constant temperature condition is to subject the crystal to a heating medium comprising a slurry of fusible material having a melting temperature corresponding to the desired constant temperature condition for the crystal. It is well known that at the melting temperature of a fusible material, the slurry can be maintained as such over a wide range of heat application from the heating element, since the melting point temperature is independent of the ratio of liquid to solid material in the slurry.

While the above described system serves its intended purpose in maintaining a constant temperature heating medium, it has been found that such a system is subject to a number of disadvantages creating limitations on its use. A major disadvantage is that the control temperature of the slurry heating medium cannot be adjusted to meet different requirements. The reason for this is that the control temperature of such a heating medium depends entirely on the melting temperature of the fusible material. Attempts have been made to change the operating temperature or melting temperature of the slurry such as by adding impurities to the fusible material. However, it has been found that the impurities produce a hysteresis effect which changes the melting temperature.

Because of the above disadvantage, it has been necessary to cut the oscillator crystal to a predetermined temperature turnover point. This cutting operation is extremely difficult, and considerable expense is involved in producing a crystal for use with a particular change of state material.

It is an object of this invention to overcome the above disadvantage by positioning the crystal within a constant temperature gradient so that the temperature of the crystal may be varied by adjusting its position within the gradient.

Another object of this invention is to produce a temperature gradient by means of two constant temperature heating mediums having different operating temperatures.

Another object of this invention is to adjust the temperature of an object by varying its position within a temperature gradient.

In one preferred embodiment of the invention, the crystal or other object to be maintained at a constant temperature is positioned between two constant temperature heating mediums having different operating temperatures. The two heating mediums establish a constant temperature gradient across the object to thus maintain the same at a temperature intermediate the control temperature of the heating mediums. The temperature of the object is adjusted by varying its position relative to the heating mediums in the temperature gradient.

Other objects and advantages will become apparent from the following description taken in connection with the accompanying drawings wherein:

FIG. 3 is a schematic illustration similar to a portion of FIG. 1 but showing another embodiment of the invention;

FIG. 4 is a schematic illustration similar to a portion of FIG. 1 but showing still another embodiment of the invention;

FIG. 5 is a schematic illustration similar to a portion of FIG. 1 but showing still another embodiment of the invention;

Figure 1:
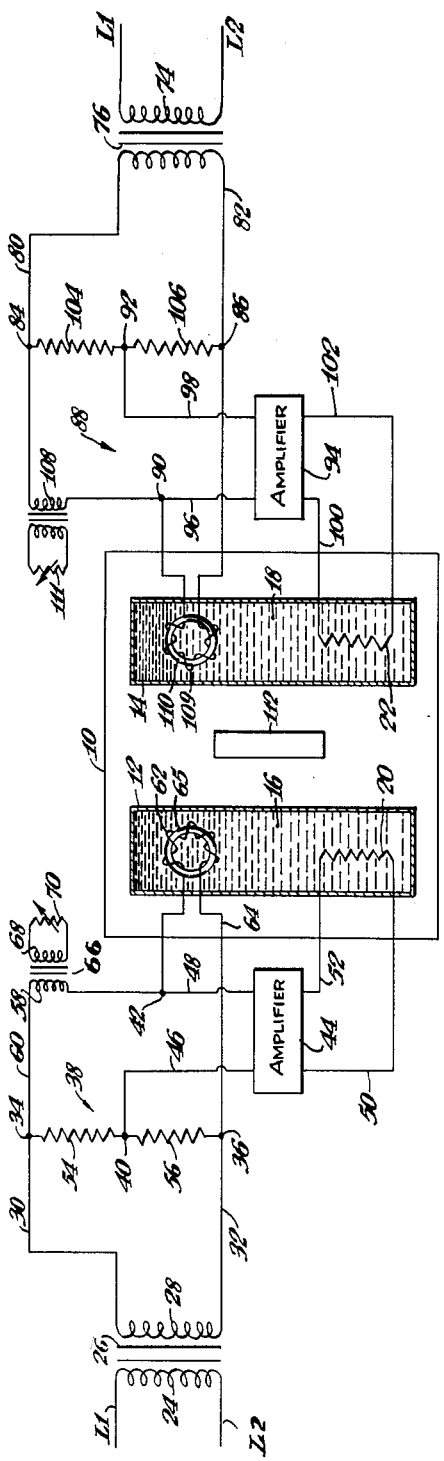
FIG. 1 is a schematic illustration of a temperature control device embodying this invention.

Referring more paricularly to FIG. 1, there is shown a base member 10 having a pair of containers 12, 14 of insulating material mounted adjacent the ends thereof respectively. The container 12 is filled with an electrically conductive material 16 having a predetermined fusion temperature, and the container 14 is filled with an electrically conductive material 18 having a predetermined fusion temperature different from that of the material 16. A pair of electric heating elements 20, 22 are positioned within the containers 12, 14, respectively, for heating the materials 16, 18 to the fusion temperatures thereof.

Control means are provided for maintaining the material 16 at its fusion temperature and in a slurry condition. This means comprises a primary winding 24 of a transformer 26 connected across a pair of line wires L1, L2 of a suitable source of alternating voltage. A secondary winding 28 of the transformer 26 is connected by a pair of conductors 30, 32 to a pair of input terminals 34, 36, respectively, of a bridge circuit indicated generally by the reference numeral 38 for impressing the alternating voltage of the source on the bridge circuit 38.

The bridge circuit 38 is provided with a pair of output terminals 40, 42 which are connected to the input side of a power amplifier 44 by a pair of conductors 46, 48, respectively. The output side of the power amplifier 44 is connected by a pair of conductors 50, 52 to the heating element 20.

The bridge circuit 38 includes a resistor 54 connected between the terminals 34, 40 to define one arm of the bridge, and a resistor 56 connected between the terminals 36, 40 to define another arm of the bridge. An inductance coil 58 is connected by a conductor 60 between the terminals 34, 42, and a second inductance coil 62 is connected between the terminals 42, 36 by a conductor 64. The inductance coil 62 is immersed in the material 16 and wound on a toroidal core 65 to be responsive to the liquid-solid ratio thereof as will later be apparent.

The inductance coil 58 forms a primary winding of a transformer 66 having a secondary winding comprising a coil 68. A variable resistance 70 is connected across the secondary winding 68. The coils 58, 68, 62 are preferably identical each having the same number of turns.

In the above described circuitry, the coil 62 acts as a primary winding of a transformer and the material 16 forms a single turn secondary winding of resistance proportional to the conductivity of the material 16. The material 16 may be any suitable fusible conductive material having a high latent heat of fusion and the container 12 is made of insulating or non-conductive material or insulated from the material 16 by coatings on the inner walls thereof. The resistances 54, 56 of the bridge circuit 38 are standard resistors and the circuit 38 is in balanced condition when the impedance of the coil 62 equals the impedance of the coil 58.

In operation of the described circuitry, the insulating properties of the container 12 are selected so that when a predetermined liquid-solid ratio of the material 16 exists in the slurry state thereof, a condition of equilibrium is established where the power input to the heating element 20 is equal to the heat loss from the material 16. This equilibrium point may be selected at a point where the proportions of liquid and solid material are equal.

The value of resistance 70 is adjusted to cause balance of the bridge circuit 38 when the material 16 is in a liquid state. Therefore, the bridge circuit 38 will normally be unbalanced during operation at the equilibrium condition where power input to the heating element 20 equals the heat loss from the material 16. If a change in liquid-solid ratio of the material should occur, there will be a corresponding change in the conductivity of the material 16 and thus a change in impedance of the coil 62. This change in impedance of the coil 62 is reflected in a change in bridge balance to vary the power input to the heating element 20 to restore the equilibrium condition. In this manner, accurate control of the liquid-solid ratio of the material 16 is maintained and accordingly, the temperature of the material 16 is always the fusion temperature thereof.

A similar control circuit is provided for the material 18 within the container 14 for maintaining the material 18 at its fusion temperature and in a slurry condition. This means comprises a primary winding 74 of a transformer 76 connected across a pair of line wires L1, L2 of the source of alternating voltage. The secondary winding 78 of the transformer 76 is connected by a pair of conductors 80, 82 to a pair of input terminals 84, 86, respectively, of a bridge circuit 88 for impressing the alternating voltage of the source thereon.

The bridge circuit 88 is provided with a pair of output terminals 90, 92 which are connected to the input side of a power amplifier 94 by a pair of conductors 96, 98, respectively. The output side of the power amplifier 94 is connected by a pair of conductors 100, 102 to the heating element 22.

The bridge circuit 88 includes a resistor 104 connected between the terminals 84, 92 to define one arm of the bridge circuit 88, and a resistor 106 connected between the terminals 86, 92 to define another arm of the bridge. An inductance coil 108 is connected between the terminals 84, 90, and a second inductance coil 109 is connected between the terminals 90, 86. The inductance coil 109 is immersed in the material 18 and wound on a toroidal core 110 to be responsive to the liquid-solid ratio of the material 18. A variable resistance 111 is coupled to the coil 108 to provide a means for varying the impedance of the coil 108.

Since the material 18 is different from that of the material 16, the circuit elements described in connection with the control means for the material 18 may have slightly different values than the circuit elements for controlling the material 16. However, the operation of the control means for the material 18 is substantially identical to that of the control means for the material 16, the coil 109 being sensitive to variations in the conductivity and liquid-solid ratio of the material 18 to control the degree of bridge unbalance and the power input to the heating element 22.

While the above-described circuits provide a satisfactory means for controlling the temperature of the materials 16, 18, it will be apparent to those skilled in the art that various other means may be employed and that the control means disclosed are for purposes of illustration only.

Figure 2:
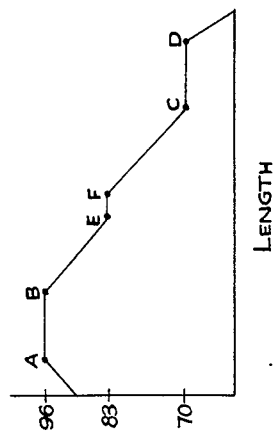
FIG. 2 is a graph illustrating the result obtained with the invention.

FIG. 2 is a graphic illustration of the temperature condition established by the materials 16, 18 when the same are at their melting temperatures respectively. More particularly, the line connecting points A and B is indicative of the constant temperature condition over the width of the container 12 corresponding to the melting temperature of the material 16. Likewise, the line connecting points C and D is indicative of the constant temperature condition over the width of the container 14 corresponding to the melting temperature of the material 18. The distance between points B and C corresponds to the space between the containers 12, 14. Since the melting temperatures of the materials 16, 18 are different, a temperature gradient is established between points B and C as indicated by the sloping line connecting these points on the graph. It will be apparent that by maintaining the material 16, 18 in a slurry state, the temperature gradient between points B and C can be maintained constant. In addition, it will be apparent that the base 10 and containers 12, 14 may be suitably enclosed with an insulating cover so as to substantially eliminate any effect of ambient conditions on the temperature gradient.

A container, indicated by the reference numeral 112, may be positioned intermediate the containers 12, 14 to provide a means for supporting an object to be heated intermediate the containers 12, 14. The container 112 is preferably of metallic material having good thermal conducting characteristics. As a result, there will be substantially no temperature gradient axially across the container 112 as indicated on the graph in FIG. 2 wherein the line connecting points E and F is illustrative of the temperature over the width of the container 112.

The line connecting points E and F on the graph illustrates that the container 112 is subjected to a temperature intermediate the melting temperatures of the materials 16, 18, respectively. This temperature to which the container 112 is subjected depends on its position within the temperature gradient established between the containers 12, 14. Accordingly, by moving the container 112 relative to the containers 12, 14, the temperature to which the container 112 is subjected can be varied along the line between points B and C. Since the temperature of the materials 16, 18, respectively, will be constant, it will be apparent that the temperature will be constant at any point between B and C.

It will now be apparent that the structure illustrated in FIG. 1 provides a convenient means of adjusting the temperature to which an object such as an oscillator crystal is subjected. More particularly, the oscillator crystal may be positioned within the container 112 and then moved relative to the containers 12, 14 within the temperature gradient between points B and C to a temperature corresponding to its temperature turnover point. This method of heating the oscillator crystal eliminates the previous method of cutting the crystal to a predetermined temperature turnover point corresponding to the melting temperature of the heating material.

Another embodiment of the heating device is illustrated in FIG. 3 wherein parts corresponding to those shown in FIG. 1 are given like reference numerals. More particularly, in FIG. 3 there is illustrated a means for conveniently adjusting the position of the container 112 relative to the containers 12, 14. This means comprises two heat conductive rails 114, 116 positioned in parallel relationship and having the ends thereof in thermal contact with the containers 12, 14. The container 112 is supported in a heat conductive member 118 which is slidably mounted between the rails 114, 116 intermediate the containers 12, 14.

The lead screw mechanism is provided for positioning the member 118 between the containers 12, 14, and comprises a lead screw 120 having one end connected to the member 118 and the other end thereof extending from the base 10 and carrying a knob 122. A portion of the lead screw 120 is received by a suitable threaded support member 124 to effect axial movement of the screw 120 upon rotation of the knob 122.

In operation of the structure illustrated in FIG. 3, the rails 114, 116 are heated by the materials 16, 18, to establish a temperature gradient across the rails 114, 116 similar to that illustrated in FIG. 2. Heat is also conducted between the walls 114, 116 through the member 118 to subject the container 112 to a temperature within the temperature gradient.

If it is desired to vary the temperature of the container 112, the knob 122 may be rotated to move the screw 120 axially relative to the support member 124 to vary the position of the conductive member 118 relative to the containers 12, 14. In this manner, the container 112 may be subjected to a desired temperature intermediate the melting temperatures of the materials 16, 18.

Another embodiment of the invention is illustrated in FIG. 4 wherein parts corresponding to those illustrated in FIGS. 1 and 3 are given like reference numerals. More particularly, an expansible bellows member 128 is mounted between the containers 12, 112 and a second expansible bellows member 130 is mounted between the containers 112, 14. The oppositely disposed ends of the bellows member 128, 130 are fixed to the adjacent walls of the containers 12, 14, respectively. The other ends of the bellows members 128, 130 engage opposite sides respectively of the container 112.

The interiors of the bellows members 128, 130 are filled with a heat conductive fluid and connected in communication by means of a capillary tube 132 extending between the bellows members 128, 130. In this modification, the lead screw 120 is connected directly to the container 112.

In operation of the structure illustrated in FIG. 4, heat is conducted through the fluid filling the bellows members 128, 130 and through container 112. In this manner, a constant temperature gradient is established as illustrated in the graph in FIG. 2. If it is desired to vary the position of the container 112 within this temperature gradient, the knob 122 may be rotated to move the container 112 relative to the containers 12, 14. Movement of the container 112 toward the container 14 will compress the bellows member 130 and force fluid therefrom through the capillary tube 132 into the bellows member 128. This expansion of the bellows 128 and contraction of the bellows 130 will serve to maintain the ends thereof in engagement with opposite sides of the container 112 respectively. Accordingly, thermal contact of the container 112 with the bellows members 128, 130 is assured during movement of the container 112.

If it should be desired to move the container 112 toward the container 12, the knob 122 may be rotated in an opposite direction. In this case, movement of the container 112 will compress the bellows member 128 to force fluid therefrom into the bellows member 130 to expand the bellows member 130.

Another embodiment of the invention is illustrated in FIG. 5 wherein parts corresponding to those hereinbefore are given like reference numerals. In this modification, the container 112 is carried on one end of a rod 136 which may be slidably mounted on the base member 10 and provided with a suitable knob 138. The rod 136 is slidably received within a boss 140 and held in position relative to the base member 10 by a set screw 142 threaded within the boss 140. A spring 144 is mounted in tension between the container 112 and the container 14 for biasing the container 112 toward the container 14.

A plurality of flexible baffles 146 are mounted between the containers 12, 14. The baffles 146 are of low thermal conductivity material, such as nylon, Teflon, etc. A portion of each of the baffles 146 is mounted in compression between the containers 12, 114, and another portion of each of the baffles is mounted in compression between the containers 112, 14.

In operation of the embodiment illustrated in FIG. 5, a temperature gradient is established in the spaces between the baffles 146 by the materials 16, 18. If it should be desired to position the container 112 relative to the containers 12, 14, the screw 142 may be loosened and the rod 136 moved axially to vary the position of the container 112. Movement of the container 112 toward the container 14 will compress the baffles 146 mounted between the container 112 and container 14. On the other hand, movement of the container 112 in the opposite direction will compress the baffles 146 mounted between the container 112 and the container 12.

Figure 6:
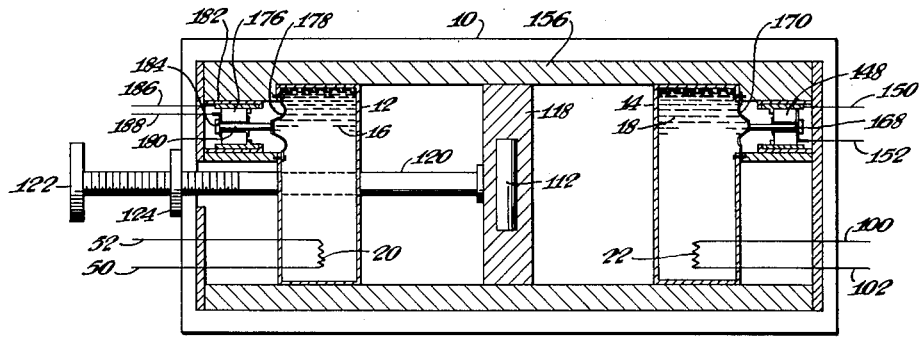
FIG. 6 is a schematic illustration similar to a portion of FIG. 1 but showing still another embodiment of the invention.
Figure 7:
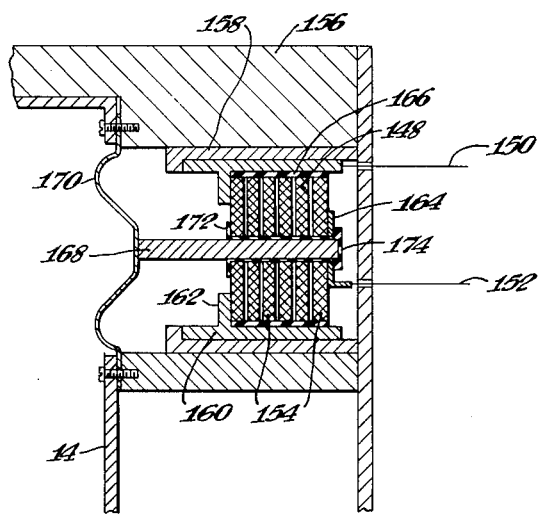
FIG. 7 is a fragmentary view of a portion of the apparatus shown in FIG. 6, but on an enlarged scale showing the arrangement of the carbon pile heating element.

Another embodiment of the invention is illustrated in FIGS. 6 and 7 wherein parts corresponding to those illustrated in figures hereinbefore are given like reference numerals. In this embodiment, the carbon pile 148 has been provided, at one section of jacket 14, as a heating element which receives current from the external source through the conductors 150 and 152 leading from the terminals 90 and 86, respectively, of the circuit shown in FIG. 1. The carbon pile heating element consists of a series of centrally apertured carbon discs 154 confined within the bore of the conductive rail 156 and electrically insulated therefrom by means of a flanged ferrule 158.

A cylindrical collar 160, of any suitable metal, having an internal flange 162 makes electrical contact at said flange with one end of the carbon pile 148, a washer 164 makes electrical contact with the other end of the pile 148. A sleeve 166 electrically insulates individual carbon discs 154 from the collar 160.

A control plunger 168, having an end rigidly mounted on a diaphragm 170 and insulated from the carbon pile 148 by means of a tubular sleeve 172, extends through the central bore of the carbon pile 148 and the washer 164 and terminates in a cap member 174 of insulation material. The plunger 168 may be made of aluminum and its outer surface may be heavily anodized to provide an effective electrical insulation against the carbon pile 148. In such an event, the tubular insulating sleeve 172 can be dispensed with.

The carbon pile 176 provided at jacket 12 is constructed in exactly the same manner as the carbon pile 148, and comprises a diaphragm 176, plunger 180, cylindrical collar 182 and washer terminal 184, all having respective functions as corresponding structures described for carbon pile 148. The conductors 186, 188 respectively, lead from cylindrical collar 182 in the washer terminal 184 to the external circuit, shown in FIG. 1, and connect thereto at terminal points 42 and 36, respectively.

In operation, the carbon piles 148 and 176, constituting the heating elements, receive current from the respective external circuits shown in FIG. 1 and heat the wall of the rail 156. The heat is conducted to the container jackets 12 and 14 and to the respective fusible materials 16 and 18. This heat combined with the heat from the heating elements 20, 22 will cause the temperature of the materials 16 and 18 to rise. When the material temperature rises to the fusion point, the materials 16, 18 expand and push the respective diaphragms 170 and 178 outward. As a result, the respective plungers 168 and 180 move outward so that the normal pressure on the individual carbon discs is decreased and the electrical resistance of the carbon pile thereby is increased. The increase in carbon pile resistance causes a decrease in current furnished to the pile and the heating elements 20 and 22 thereby causing the materials 16 and 18 to cool. When the temperature of the fusible materials 16 and 18 falls so that they begin to solidify, the mass of the materials 16, 18 begins to contract, causing the plungers 168, 180 to move back to increase the current flow through the carbon piles 148, 176. In this manner, a carbon pile operates as a thermostatic element and controls the heat energy furnished to the fusible materials 16, 18.

While several embodiments of the invention have been herein shown and described, it will be apparent to those skilled in the art that many changes may be made in the construction and arrangement of parts without departing from the scope of the invention as defined by the appended claims.

I claim:

1. In a system for controlling the temperature of an object exposed to heat, the combination comprising a first heating medium positioned on one side of the object and comprising a slurry of fusible material having a first predetermined fusion temperature, a second heating medium positioned on the other side of the object and comprising a slurry of fusible material having a second predetermined fusion temperature different from said first temperature, a first expansible and contractible element extending from said first heating medium in engagement with one side of the object, a second expansible and contractible element extending from said second heating medium in engagement with the other side of the object, said second element having an interior thereof communicating with the interior of said first expansible element to define a closed system, a thermally conductive fluid filling said system to establish a temperature gradient across the object corresponding to the difference between said first and second temperatures, and means for adjusting the position of the object relative to said mediums to cause compression of said first element and expansion of said second element.

2. A system as claimed in claim 1 wherein said first and second elements comprise a pair of expansible bellows members.

3. In a system for controlling the temperature of an object exposed to heat, the combination comprising a first heating medium positioned on one side of the object and comprising a slurry of fusible material having a first predetermined fusion temperature, a second heating medium positioned on the other side of the object and comprising a slurry of fusible material having a second predetermined fusion temperature different from said first temperature, a plurality of flexible baffles of low thermal conductivity extending between said mediums to permit the conductive flow of heat therebetween to establish a temperature gradient between said mediums corresponding to the difference between said first and second temperatures, and means for adjustably positioning the object with said baffles to vary the position of the same within said temperature gradient.

4. In a temperature controlling device, the combination comprising heat responsive means, spaced first and second fusible materials disposed adjacent said heat responsive means in heat transfer relationship thereto and each enclosed to provide a linear expansion according to the degree of fusion thereof, said first material having a liquid-solid ratio range at a predetermined fusion temperature, said second material having a liquid-solid ratio range at a predetermined fusion temperature different than said first material, an electric heating coil for each of said materials to heat the same to their respective fusion temperatures, said heat responsive means being subjected to the two fusion temperatures to establish a temperature gradient between the spaced first and second materials, pressure-actuated control means for each heating coil including a carbon pile responsive to said expansion within said liquid-solid range of its corresponding fusible material for regulating an electric current through the heating coil of such corresponding fusible material, said carbon pile being disposed in heat transfer relationship to its corresponding fusible material to supply additional heat thereto for maintaining said corresponding fusible material at its fusion temperature.

5. In a temperature controlling device, the combination comprising a pair of spaced containers, a first fusible material expansible upon fusion in one container having a variable liquid-solid ratio at a predetermined fusion temperature, a second fusible material expansible upon fusion in the other container having a variable liquid-solid ratio at a predetermined fusion temperature different from said first material, means including electric circuit means for each of said containers to heat said first and second materials to their respective fusion temperatures, pressure sensitive control means for each heating means including a carbon pile, a plunger operatively connected to said carbon pile to vary the operation thereof, and a diaphragm member connected to said plunger for actuating the same, said diaphragm member forming a wall part of its corresponding container to generate a variable pressure on said control means responsive to changes in the liquid-solid ratio of the fusible material therein at respective said predetermined temperatures and means for positioning an object between said spaced containers so as to be subject to a temperature intermediate the fusion temperatures of said first and second materials.

6. The combination as recited in claim 5 wherein said last mentioned means comprises a support and a lead screw mechanism operatively connected to said support for adjustably positioning the same.

7. In a temperature controlling device, the combination comprising heat responsive means, spaced first and second fusible materials disposed adjacent said heat responsive means in heat transfer relationship thereto, said first material having a liquid-solid ratio at a predetermined fusion temperature, said second material having a liquid-solid ratio at a predetermined temperature different than said first material, an electric heating coil for each of said materials to heat the same to their respective fusion temperatures, said heat responsive means being subjected to the two fusion temperatures to establish a temperature gradient between the spaced first and second materials, control means for each heating coil including a carbon pile resistance heater being disposed in heat transfer relationship to its corresponding fusible material to supply additional heat thereto for maintaining said corresponding fusible material at its fusion temperature, and operating means for each carbon pile resistance heater and being responsive to the liquid-solid ratio of the corresponding fusible material for proportionally regulating the operation of its corresponding carbon pile resistance heater according to variations in the liquid-solid ratio of said corresponding fusible material, said carbon pile resistance heater being electrically connected to its corresponding heating coil for proportionally regulating the same.

8. A temperature controlling device comprising a pair of spaced containers, a first fusible material expansible upon fusion in one container having a variable liquid-solid ratio at a predetermined fusion temperature, a second fusible material expansible upon fusion in the other container haivng a variable liquid-solid ratio at a predetermined fusion temperature different from said first material, means including electric circuit means for each of said containers to heat said first and second materials to their respective fusion temperatures, pressure sensitive control means for each heating means including a pressure responsive impedance member, a plunger operatively connected to said impedance member to vary the impedance thereof, and a diaphragm member forming a wall part of its corresponding container to generate a variable pressure on said control means responsive to changes in the liquid-solid ratio of the fusible material therein at respective said predetermined temperatures, and means for positioning an object between said spaced containers so as to be subject to a temperature intermediate the fusion temperatures of said first and second materials.

9. A temperature controlling device comprising a pair of spaced encapsulated masses of material expansible upon fusion having points of fusion at different respective temperatures, thrust means actuated by a capsule wall contacting each said mass, a pair of variable impedance elements each having an impedance value substantially varying with pressure applied thereto, means responsive to movement of said thrust means applying said pressure, electrical heating means for each said mass continuously energized in amount varying with the degree of fusion of each said mass to establish regulated fixed temperatures, and means for positioning an object between said spaced masses so as to be subject to a temperature intermediate said fixed temperatures.

References Cited in the file of this patent

UNITED STATES PATENTS

| | | |
|---|---|---|
| 1,261,086 | Wilson et al. | Apr. 2, 1918 |
| 2,096,571 | Williams | Oct. 19, 1937 |
| 2,488,422 | Mershon | Nov. 15, 1949 |
| 2,524,886 | Colander et al. | Oct. 10, 1950 |
| 2,528,377 | Maltby | Oct. 31, 1950 |
| 2,595,814 | Rich et al. | May 6, 1952 |
| 2,598,081 | Sway | May 27, 1952 |
| 2,640,089 | Gilbert | May 26, 1953 |
| 2,898,434 | Lemmerman et al. | Aug. 4, 1959 |